United States Patent
Hendrickson et al.

(10) Patent No.: US 11,107,307 B2
(45) Date of Patent: Aug. 31, 2021

(54) SYSTEMS AND METHODS FOR PROBABILISTIC ON-BOARD DIAGNOSTICS

(71) Applicant: Ford Global Technologies, LLC, Dearborn, MI (US)

(72) Inventors: Cory Hendrickson, Ann Arbor, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 353 days.

(21) Appl. No.: 15/968,032

(22) Filed: May 1, 2018

(65) Prior Publication Data

US 2019/0340847 A1    Nov. 7, 2019

(51) Int. Cl.
| | |
|---|---|
| G07C 5/08 | (2006.01) |
| F02D 41/02 | (2006.01) |
| F01N 11/00 | (2006.01) |
| F02D 41/14 | (2006.01) |

(52) U.S. Cl.
CPC ............ G07C 5/0808 (2013.01); F01N 11/00 (2013.01); F02D 41/0235 (2013.01); F01N 2550/02 (2013.01); F02D 41/1454 (2013.01); F02D 41/1461 (2013.01); F02D 41/1463 (2013.01)

(58) Field of Classification Search
CPC ....... G07C 5/0808; Y02T 10/40; Y02T 10/12; F02D 41/1441; F02D 2200/08; F02D 41/22; F02D 41/0235; F02D 41/1454; F02D 41/1461; F02D 41/1463; F01N 2900/1621; F01N 13/008; F01N 2610/02; F01N 2560/14; F01N 2560/026; F01N 3/2066; F01N 2900/04; F01N 2900/14; F01N 2550/02; F01N 11/00; Y02A 50/20
See application file for complete search history.

(56) References Cited

U.S. PATENT DOCUMENTS

| | | | | |
|---|---|---|---|---|
| 5,631,831 | A | * | 5/1997 | Bird ..................... G01M 15/05 |
| | | | | 701/102 |
| 5,656,765 | A | * | 8/1997 | Gray ................... F02D 41/1441 |
| | | | | 60/276 |
| 5,940,535 | A | | 8/1999 | Huang |

(Continued)

OTHER PUBLICATIONS

Pernestal, Anna; Probabilistic Fault Diagnosis with Automotive Applications, 2009, Department of Electrical Engineering, Linköping University, SE-581 83 Linköping, Sweden. (Year: 2009).*

(Continued)

*Primary Examiner* — Hung Q Nguyen
*Assistant Examiner* — Susan E Scharpf
(74) *Attorney, Agent, or Firm* — Geoffrey Brumbaugh; McCoy Russell LLP

(57) ABSTRACT

Methods and systems are provided for probabilistic on-board diagnostics. In one example, a method may include calculating a probabilistic metric for a sample of a measured operating condition of a vehicle system component, averaging a plurality of probabilistic metrics including the probabilistic metric for a plurality of samples including the sample, and determining whether the vehicle system component is degraded based on the averaged plurality of probabilistic metrics. In this way, the functionality of a vehicle system component may be continuously monitored without regard for specific diagnostic entry conditions.

5 Claims, 5 Drawing Sheets

(56) References Cited

U.S. PATENT DOCUMENTS

| | | | |
|---|---|---|---|
| 5,941,918 A * | 8/1999 | Blosser | F01N 13/008<br>701/31.7 |
| 6,205,774 B1 * | 3/2001 | Hohner | F01N 11/00<br>60/277 |
| 6,292,723 B1 * | 9/2001 | Brogan | F02C 9/00<br>701/31.7 |
| 6,564,543 B1 * | 5/2003 | Orzel | F01N 13/009<br>60/277 |
| 6,581,371 B1 * | 6/2003 | Orzel | F01N 11/00<br>60/277 |
| 6,594,989 B1 * | 7/2003 | Hepburn | B01D 53/9431<br>60/274 |
| 7,027,953 B2 | 4/2006 | Klein | |
| 7,043,899 B2 * | 5/2006 | Wang | F01N 11/00<br>60/277 |
| 7,195,001 B1 * | 3/2007 | Pallett | F02D 17/02<br>123/443 |
| 7,991,583 B2 | 8/2011 | Balzer et al. | |
| 8,010,471 B2 | 8/2011 | Zhang et al. | |
| 8,019,501 B2 | 9/2011 | Breed | |
| 8,141,340 B2 * | 3/2012 | Garimella | F01N 3/208<br>60/277 |
| 8,151,560 B2 * | 4/2012 | Zanini-Fisher | F01N 11/00<br>60/297 |
| 8,800,356 B2 * | 8/2014 | Makki | G06N 20/00<br>73/114.75 |
| 9,097,166 B2 * | 8/2015 | Makki | F01N 11/00 |
| 9,273,587 B2 | 3/2016 | Khaled et al. | |
| 9,638,122 B2 | 5/2017 | Smith et al. | |
| 2002/0120386 A1 * | 8/2002 | Shi | F01N 11/007<br>701/114 |
| 2004/0187482 A1 * | 9/2004 | Bidner | F01N 11/007<br>60/285 |
| 2004/0249556 A1 * | 12/2004 | Makki | F01N 11/005<br>701/114 |
| 2007/0125349 A1 * | 6/2007 | Zanini-Fisher | F02D 41/222<br>123/679 |
| 2007/0137181 A1 * | 6/2007 | Upadhyay | F01N 11/002<br>60/286 |
| 2007/0215130 A1 * | 9/2007 | Shelby | F02D 19/084<br>123/637 |
| 2008/0178656 A1 * | 7/2008 | Nieuwstadt | F01N 11/00<br>73/23.31 |
| 2010/0101214 A1 * | 4/2010 | Herman | F01N 3/208<br>60/277 |
| 2010/0180576 A1 * | 7/2010 | Wang | F01N 3/2066<br>60/276 |
| 2010/0218487 A1 * | 9/2010 | Wang | F01N 11/005<br>60/287 |
| 2010/0226582 A1 | 9/2010 | Luo et al. | |
| 2010/0235141 A1 * | 9/2010 | Wang | F02D 41/222<br>702/183 |
| 2012/0124967 A1 * | 5/2012 | Yang | F01N 3/0814<br>60/274 |
| 2012/0260625 A1 * | 10/2012 | Feldmann | F01N 11/00<br>60/273 |
| 2012/0304751 A1 * | 12/2012 | Dobson | F02D 41/0255<br>73/114.75 |
| 2014/0283589 A1 * | 9/2014 | Makki | F01N 11/007<br>73/114.75 |
| 2016/0160779 A1 * | 6/2016 | Yeager | F02D 35/023<br>701/103 |

OTHER PUBLICATIONS

Smussen, C. et al., "Gaussian Processes for Machine Learning (GPML) Toolbox," Journal of Machine Learning Research, vol. 11, No. 1, Nov. 2010, 5 pages.

* cited by examiner

SYSTEMS AND METHODS FOR PROBABILISTIC ON-BOARD DIAGNOSTICS

FIELD

The present description relates generally to methods and systems for on-board diagnostics in a vehicle system.

BACKGROUND/SUMMARY

Modern vehicles typically include controllers with on-board diagnostic (OBD) software to monitor performance of various vehicle and engine components and to alert the vehicle operator and/or service personnel when a particular component or system has degraded performance. A typical OBD approach requires robust detection of degradation to a given threshold under normal driving conditions and on standard emissions cycles. That is, traditional OBD methods identify specific entry conditions where robust separation between nominal and threshold systems occur, so that the detection of degradation can be accurately performed.

One example approach is shown by Smith et al. in U.S. Pat. No. 9,638,122. Therein, the performance of a selective catalytic reduction (SCR) catalyst is monitored by calculating SCR conversion efficiency at different catalyst temperatures. Feedgas NOx levels are artificially increased, for example by adjusting exhaust gas recirculation (EGR) operation, when the SCR catalyst temperature is above a threshold to obtain more reliable readings from NOx sensors.

However, the inventors herein have recognized potential issues with such systems. As one example, entry conditions for diagnosis can limit classification to operating points that may not be encountered often, resulting in low in-use monitor performance ratio (IUMPR) or the use of intrusive strategies, such as actively changing operating conditions, which degrade vehicle operation. Furthermore, a classification decision of degraded or nominal may be made even when the result is close to the threshold and therefore ambiguous.

In one example, the issues described above may be addressed by a method for on-board diagnostics that comprises calculating, with a probabilistic classifier, a probabilistic metric for a sample of a measured operating condition of a vehicle system component, averaging a plurality of probabilistic metrics including the probabilistic metric for a plurality of samples including the sample, and determining whether the vehicle system component is degraded based on the averaged plurality of probabilistic metrics. In this way, the vehicle system component, such as an SCR catalyst, may be continuously monitored regardless of the driving conditions and without actively manipulating the operating conditions. Furthermore, the probabilistic approach enables a vehicle system component such as an SCR catalyst to be evaluated based on multiple measurements, such as mid-bed efficiency and tailpipe efficiency, rather than a single measurement as typically used in previous approaches.

As one example, the probabilistic classifier may calculate a probability that the SCR catalyst is degraded based on mid-bed efficiencies and tailpipe efficiencies of the SCR catalyst. The probability may be discarded or rejected if the probability is ambiguous or uncertain. In this way, the systems and methods provided herein enable a robust detection of degradation of a vehicle system component regardless of entry conditions, thereby improving IUMPR.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
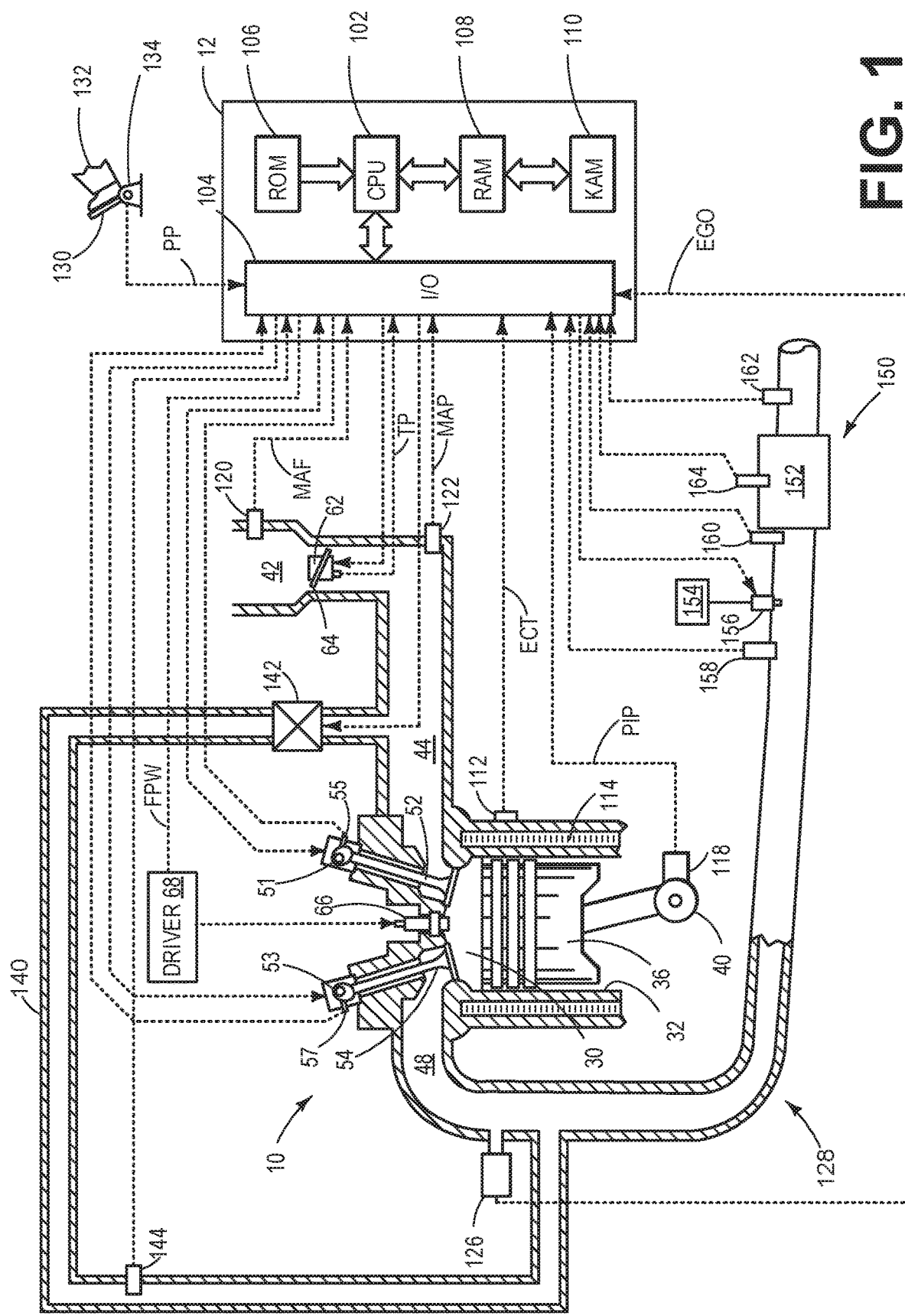
FIG. 1 shows a schematic depiction of an engine system of a vehicle.
Figure 3:
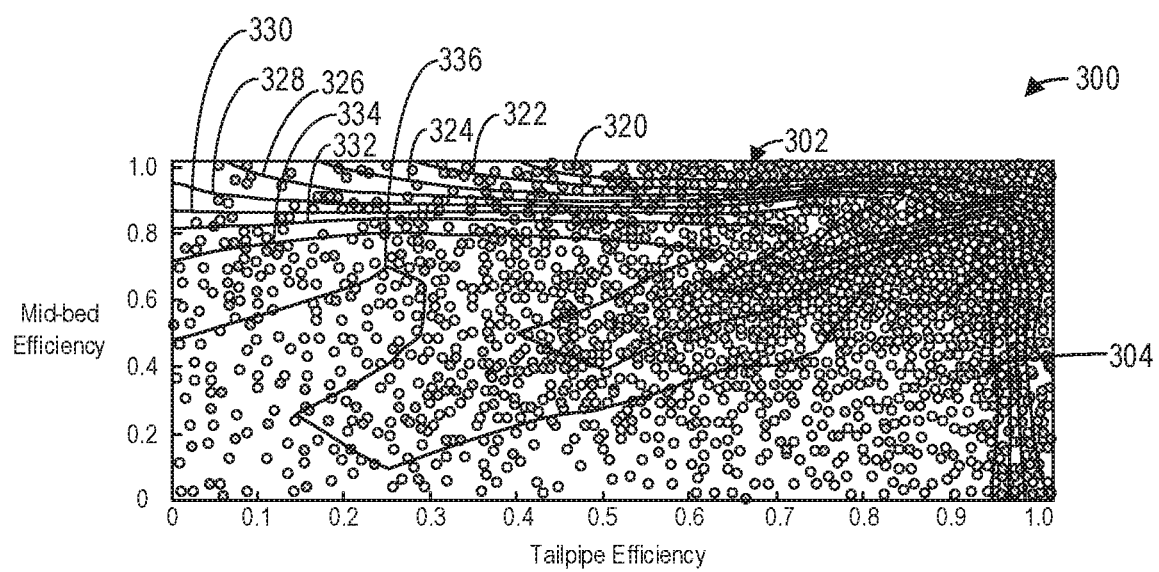
FIG. 3 shows a graph illustrating a predictive distribution of a probabilistic classifier for measurements of SCR catalyst efficiency according to an embodiment.
Figure 4:
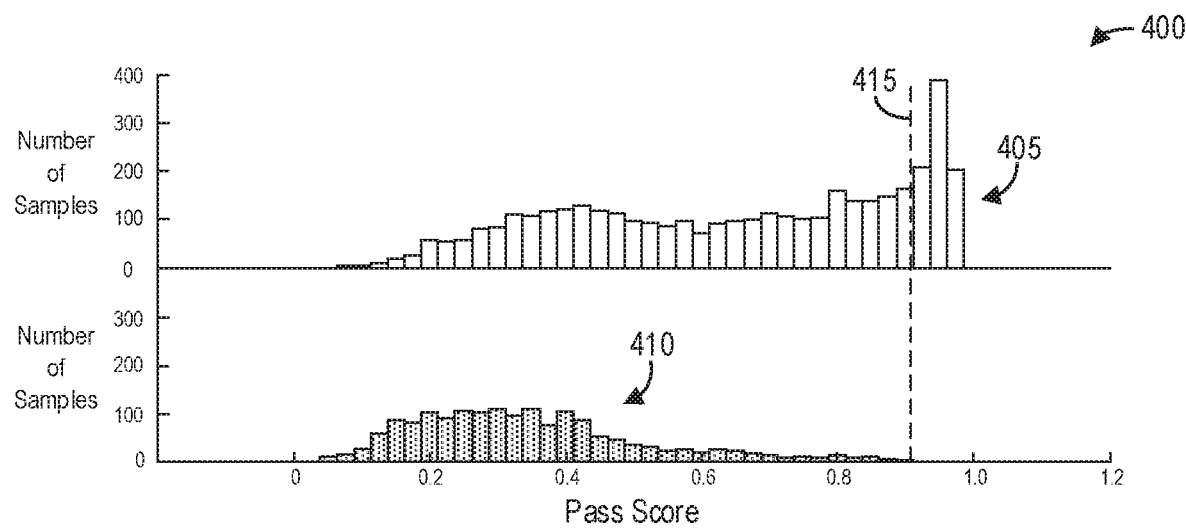
FIG. 4 shows a set of graphs illustrating example pass scores according to an embodiment.
Figure 5:
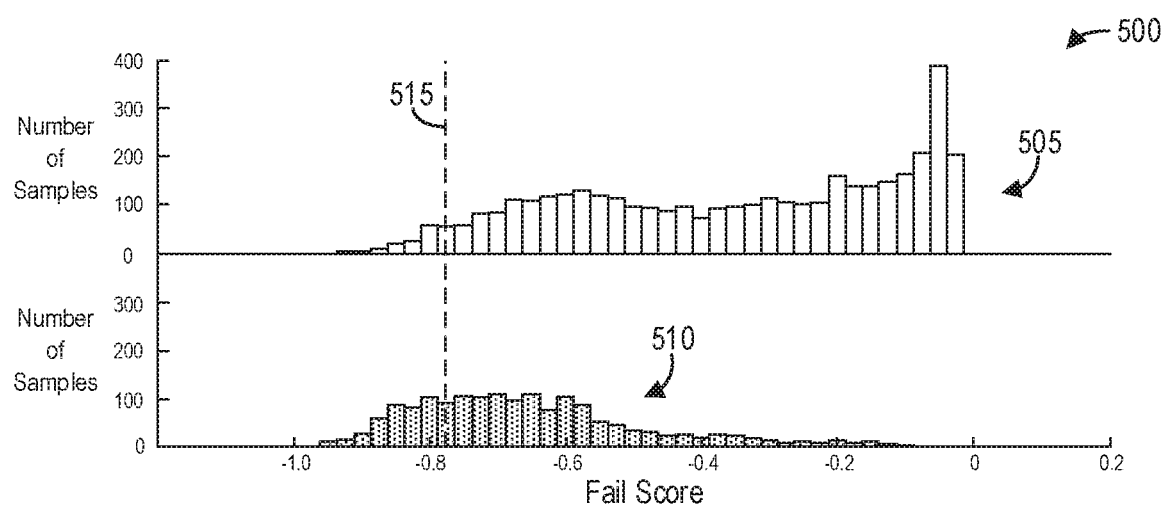
FIG. 5 shows a set of graphs illustrating example fail scores according to an embodiment.
Figure 6:
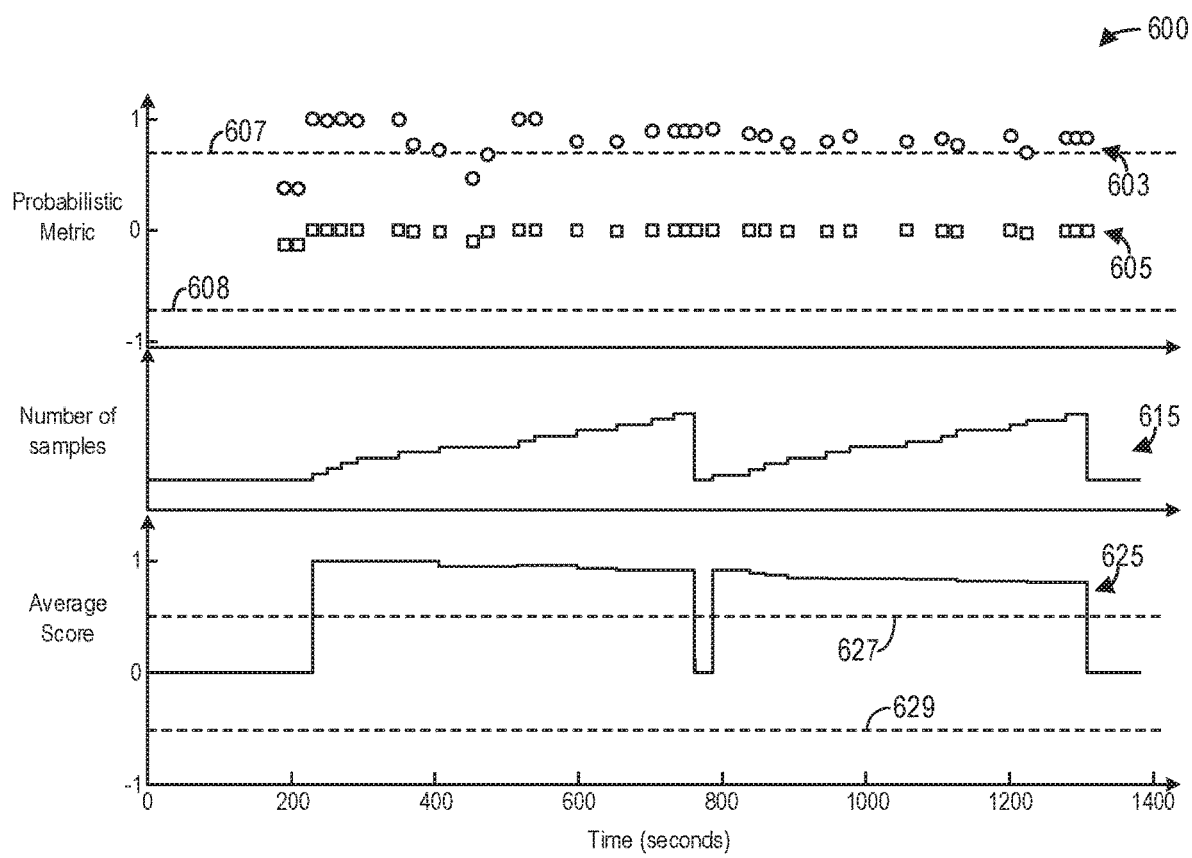
FIG. 6 shows a set of graphs illustrating an example calculation of an average score from a probabilistic metric over time according to an embodiment.
Figure 7:
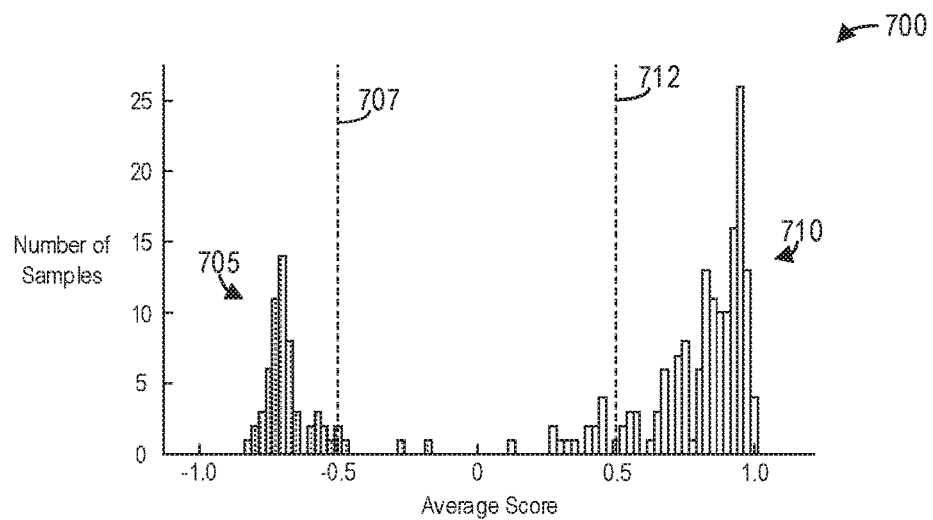
FIG. 7 shows a graph illustrating thresholds for accepting an average score according to an embodiment.

The following description relates to systems and methods for probabilistic on-board diagnostics in a vehicle system, such as the system of FIG. 1. A method for probabilistic on-board diagnostics, such as the method depicted in FIG. 2, may include calculating a probabilistic metric, also referred to herein as a probabilistic score, for pass/fail under all conditions and accepting the results only when the probability sufficiently indicates pass or fail, and rejecting the results when they are ambiguous. For example, a probabilistic classifier may be trained to calculate probabilistic scores according to measurements of selective catalytic reduction (SCR) catalyst efficiencies, as depicted in FIG. 3. The probabilistic scores may indicate the probability that the SCR catalyst is functioning normally, as depicted in FIG. 4, and may further indicate the probability that the SCR catalyst is degraded, as depicted in FIG. 5. An average score may be calculated from a given number of samples acquired over time, as shown in FIG. 6, in order to further increase the robustness of the probabilistic approach. Different thresholds may be used to evaluate the average score, as shown in FIG. 7.

FIG. 1 shows a schematic diagram with one cylinder of a multi-cylinder engine 10, which may be included in a propulsion system of a vehicle. Engine 10 may be controlled at least partially by a control system including a controller 12 and by input from a vehicle operator 132 via an input device 130. In this example, input device 130 includes an accelerator pedal and a pedal position sensor 134 for generating a proportional pedal position signal PP. A combustion chamber (i.e., cylinder) 30 of the engine 10 may include combustion chamber walls 32 with a piston 36 positioned therein. Piston 36 may be coupled to a crankshaft 40 so that reciprocating motion of the piston is translated into rotational motion of the crankshaft. Crankshaft 40 may be coupled to at least one drive wheel of the vehicle via an intermediate transmission system. Further, a starter motor may be coupled to the crankshaft 40 via a flywheel (not shown) to enable a starting operation of the engine 10.

Combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via intake valve 52 and exhaust valve 54 respectively. In some embodiments, the combustion chamber 30 may include two or more intake valves and/or two or more exhaust valves.

In the example depicted in FIG. 1, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and the exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

In some embodiments, each cylinder of the engine 10 may be configured with one or more fuel injectors for providing fuel thereto. As a non-limiting example, the cylinder 30 is shown including one fuel injector 66. Fuel injector 66 is shown coupled directly to the cylinder 30 for injecting fuel directly therein in proportion to the pulse width of signal FPW received from controller 12 via electronic driver 68. In this manner, fuel injector 66 provides what is known as direct injection (hereafter also referred to as "DI" of fuel into combustion chamber 30. It will also be appreciated that the cylinder 30 may receive fuel from a plurality of injections during a combustion cycle.

In one example, the engine 10 may be a diesel engine that combusts air and diesel fuel through compression ignition. In other non-limiting examples, the engine 10 may combust a different fuel including gasoline, biodiesel, or an alcohol-containing fuel blend (e.g., gasoline and ethanol or gasoline and methanol) through compression ignition and/or spark ignition.

The intake passage 42 may include a throttle 62 having a throttle plate 64. In this particular example, the position of the throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by throttle position signal TP. The intake passage 42 may include a mass air flow sensor 120 and a manifold air pressure sensor 122 for providing respective signals MAF and MAP to the controller 12.

Further, in the disclosed embodiments, an exhaust gas recirculation (EGR) system may route a desired portion of exhaust gas from the exhaust passage 48 to the intake manifold 44 via an EGR passage 140. The amount of EGR provided may be varied by controller 12 via an EGR valve 142. By introducing exhaust gas to the engine 10, the amount of available oxygen for combustion is decreased, thereby reducing combustion flame temperatures and reducing the formation of NOx, for example. As depicted, the EGR system further includes an EGR sensor 144 which may be arranged within the EGR passage 140 and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

An exhaust system 128 includes an exhaust gas sensor 126 coupled to the exhaust passage 48 upstream of an exhaust gas treatment system 150. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), NOx, HC, or CO sensor. The exhaust gas treatment 150 is shown arranged along the exhaust passage 48 downstream of the exhaust gas sensor 126.

In the example shown in FIG. 1, the exhaust gas treatment system 150 is a urea based selective catalytic reduction (SCR) system. The SCR system includes at least a SCR catalyst 152, a urea storage reservoir 154, and a urea injector 156, for example. In other embodiments, the exhaust gas treatment system 150 may additionally or alternatively include other components, such as a particulate filter, lean NOx trap, three-way catalyst, various other emission control devices, or combinations thereof. In the depicted example, the urea injector 156 provides urea from the urea storage reservoir 154. However, various alternative approaches may be used, such as solid urea pellets that generate an ammonia vapor, which is then injected or metered to the SCR catalyst 152. In still another example, a lean NOx trap may be positioned upstream of SCR catalyst 152 to generate $NH_3$ for the SCR catalyst 152, depending on the degree or richness of the air/fuel ratio fed to the lean NOx trap.

The exhaust gas treatment system 150 further includes a tailpipe exhaust gas sensor 162 positioned downstream of SCR catalyst 152. In the depicted embodiment, exhaust gas sensor 162 may be a NOx sensor, for example, measuring an amount of post-SCR NOx. Exhaust gas treatment system 150 may further include a feedgas exhaust gas sensor 158 positioned upstream of urea injector 156 and SCR catalyst 152. In the depicted embodiment, the feedgas exhaust gas sensor 158 may be a NOx sensor, for example, for measuring an amount of pre-SCR NOx received in the exhaust passage for treatment at the SCR catalyst. The exhaust gas treatment system 150 further includes a mid-bed exhaust gas sensor 164 positioned mid-bed of SCR catalyst 152. In the depicted embodiment, the mid-bed exhaust gas sensor 164 may be a NOx sensor, for example, measuring an amount of mid-SCR NOx.

In some examples, an efficiency of the SCR system may be determined based on the output of one or more of tailpipe exhaust gas sensor 162, mid-bed exhaust gas sensor 164, and feedgas exhaust gas sensor 158. For example, the SCR system efficiency may be determined by comparing NOx levels upstream of the SCR catalyst (via sensor 158) with NOx levels downstream of the SCR catalyst (via sensor 162). In particular, a tailpipe efficiency of the SCR catalyst 152 may be determined by comparing NOx levels upstream of the SCR catalyst (via feedgas exhaust gas sensor 158) with NOx levels measured downstream of the SCR catalyst 152 (via tailpipe exhaust gas sensor 162). Further, a mid-bed efficiency of the SCR catalyst 152 may be determined by comparing NOx levels upstream of the SCR catalyst (via feedgas exhaust gas sensor 158) with NOx levels measured mid-bed of the SCR catalyst 152 (via mid-bed exhaust gas sensor 164). As described further herein, the SCR catalyst 152 may be diagnosed by using the tailpipe efficiency and/or the mid-bed efficiency of the SCR catalyst 152 as features in a probabilistic classifier. In other embodiments, which do not include a dedicated NOx sensor 158 upstream of SCR catalyst 152, the conversion efficiency may be based on the exhaust gas sensor 126 (when the sensor 126 measures NOx for example) positioned upstream of the SCR system.

Exhaust system 150 further includes temperature sensor 160 placed just upstream and adjacent to SCR catalyst 152 to measure the temperature of exhaust gases entering the catalyst. Controller 12 may thus receive a measurement of a temperature of SCR catalyst 152 from the temperature sensor 160. Alternatively, temperature sensor 160 may be positioned such that it provides an indication of exhaust manifold temperature.

Controller 12 is shown in FIG. 1 as a microcomputer, including a microprocessor unit 102, input/output ports 104, an electronic storage medium for executable programs and calibration values shown as a read-only memory chip 106 in this particular example, random access memory 108, keep alive memory 110, and a data bus. The controller 12 may be in communication with and, therefore, receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to the crankshaft 40; throttle position (TP) from a throttle position sensor; absolute manifold pressure signal (MAP) from the sensor 122; and exhaust constituent concentration from the exhaust gas sensors 126 and 158. Engine speed signal (RPM) may be generated by controller 12 from signal PIP.

The storage medium read-only memory 106 can be programmed with non-transitory, computer-readable data representing instructions executable by the processor 102 for performing the methods described below as well as other variants that are anticipated but not specifically listed. Example methods are described herein with reference to FIG. 2.

As described above, FIG. 1 shows only one cylinder of a multi-cylinder engine, and each cylinder may similarly include its own set of intake/exhaust valves, fuel injector, spark plug, and so on.

Figure 2:
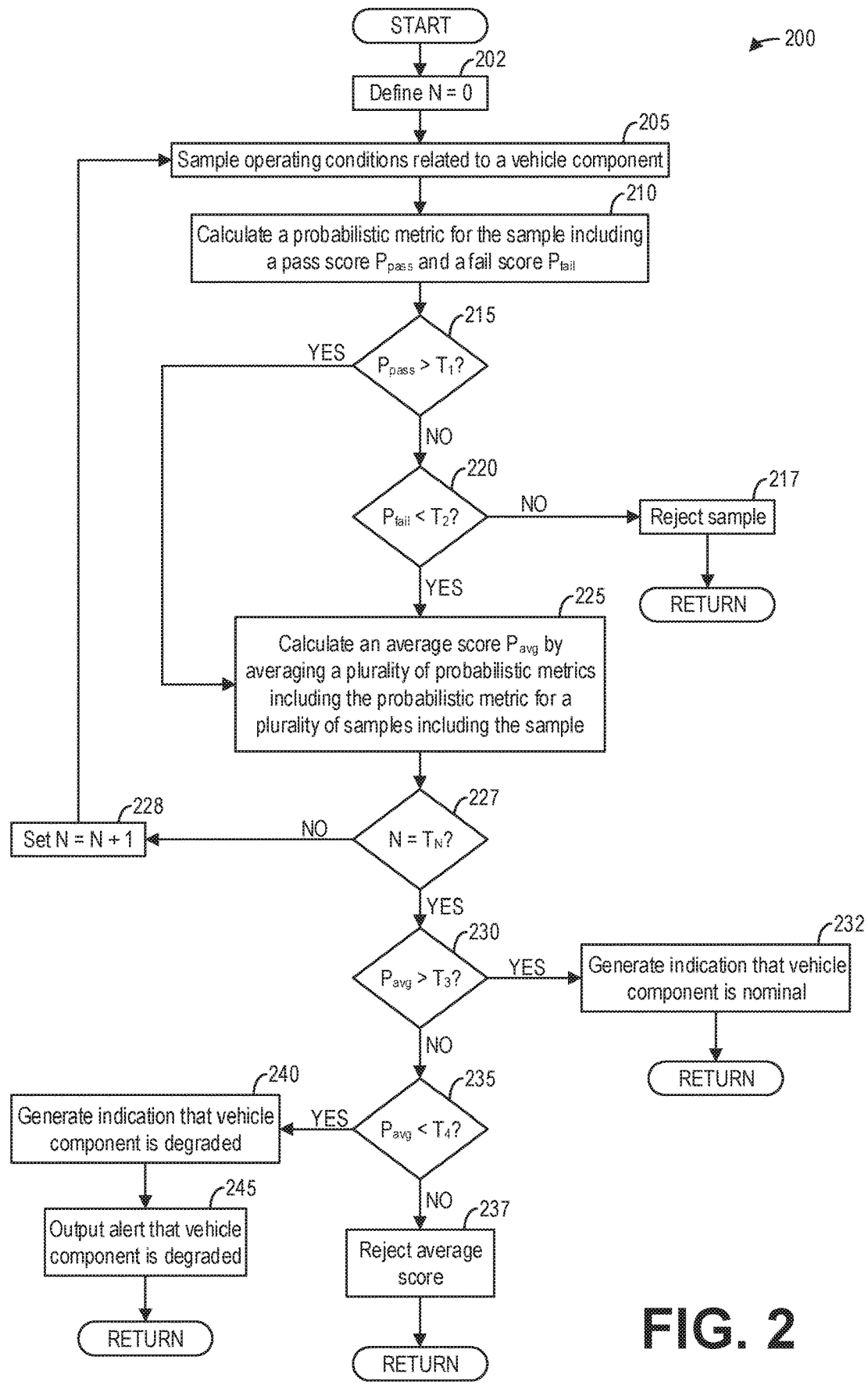
FIG. 2 shows a high-level flow chart illustrating an example method for probabilistic on-board diagnostics according to an embodiment.

FIG. 2 shows a high-level flow chart illustrating an example method 200 for probabilistic on-board diagnostics according to an embodiment. In particular, method 200 relates to determining whether a vehicle component is degraded based a probabilistic metric calculated for operating conditions. In contrast with other diagnostic methods, no entry conditions are necessary for measuring or sampling the operating conditions in order to determine degradation of a vehicle component according to method 200. Method 200 is described with reference to the systems and components of FIG. 1, though it should be appreciated that the method may be implemented with other systems and components without departing from the scope of the present disclosure. Method 200 may be implemented as executable instructions in non-transitory memory, such as the storage medium read-only memory 106, and may be executed by a processor, such as processor 102.

Method 200 begins at 202. At 202, method 200 initializes an iteration number N by defining N as equal to 1. As discussed further herein, method 200 averages a plurality of probabilistic metrics calculated for a threshold number of samples TN, also referred to herein as iteration threshold TN, and so the iteration number N increases by one for each iteration until the iteration number N equals the iteration threshold TN.

After initializing the iteration number N, method 200 continues to 205. At 205, method 200 samples operating conditions related to a vehicle component. Operating conditions may include, for example, engine speed, engine load, temperature, oxygen concentrations, exhaust constituent concentrations, actuator positions, air flow, efficiencies, and so on. Operating conditions may be sampled from signals generated by one or more sensors, Boolean or numeric values stored in memory of the controller 12, modeled signals generated by the controller 12, and so on. The particular operating conditions sampled by method 200 relate to the vehicle component being diagnosed. For example, to monitor an SCR catalyst such as SCR catalyst 152, method 200 may sample signals generated by one or more exhaust gas sensors or NOx sensors positioned proximate to the SCR catalyst, such as the feedgas exhaust gas sensor 158, the tailpipe exhaust gas sensor 162, and the mid-bed exhaust gas sensor 164. Further, the operating conditions may comprise efficiencies of the SCR catalyst calculated according to the signals generated by the exhaust gas sensors. For example, a mid-bed efficiency of the SCR catalyst 152 may be calculated according to the difference between the exhaust gas concentration measured by the feedgas exhaust gas sensor 158 and the exhaust gas concentration measured by the mid-bed exhaust gas sensor 164, while the tailpipe efficiency of the SCR catalyst 152 may be calculated according to the difference between the exhaust gas concentration measured by the feedgas exhaust gas sensor 158 or the mid-bed exhaust gas sensor 164 and the exhaust gas concentration measured by the tailpipe exhaust gas sensor 162. Thus, to monitor the SCR catalyst 152, method 200 may sample the signals generated by the feedgas exhaust gas sensor 158, the mid-bed exhaust gas sensor 164, and the tailpipe exhaust gas sensor 162, and may further calculate the mid-bed efficiency and the tailpipe efficiency of the SCR catalyst 152 based on the sampled signals.

As described further herein, the sampled operating conditions may be used as features for a probabilistic classifier. The features may be computed over a short time window to increase robustness to time delays between signals. For example, a tailpipe efficiency may be calculated over a temporal window according to:

$$\eta_{TP} = 1 - \frac{\int_{t_0}^{t_0+t_w} C_{TP} dt}{\int_{t_0}^{t_0+t_w} C_{FG} dt'}$$

wherein $\eta_{TP}$ is the tailpipe efficiency, $t_0$ is the time at the beginning of the temporal window, $t_w$ is the length of the temporal window (e.g., 10 seconds), $C_{TP}$ is the exhaust gas concentration measured by the tailpipe exhaust gas sensor 162, and $C_{FG}$ is the exhaust gas concentration measured by the feedgas exhaust gas sensor 158.

Continuing at 210, method 200 calculates a probabilistic metric including a pass score $P_{pass}$ and a fail score $P_{fail}$ for the sample. The probabilistic metric comprises a quantitative measure of how likely the vehicle component being diagnosed is degraded or not degraded. The pass score $P_{pass}$ thus comprises a quantitative measure of how likely the vehicle component is not degraded, while the fail score $P_{fail}$ comprises a quantitative measure of how likely the vehicle component is degraded. In one example, the pass score $P_{pass}$ comprises a probability and thus the value of the pass score $P_{pass}$ may range from zero (0) to one (1), wherein a pass score $P_{pass}$ of one indicates a 100% probability that the vehicle component is not degraded. Meanwhile, the fail score $P_{fail}$ may correspond to a probability, but instead may range from zero (0) to negative one (−1), wherein a fail score $P_{fail}$ of negative one indicates a 100% probability that the vehicle component is degraded. Thus, method 200 may calculate a pass probability and set the pass score $P_{pass}$ equal to the pass probability, and furthermore method 200 may calculate a fail probability and set the fail score $P_{fail}$ equal to the negative of the fail probability (e.g., $P_{fail}$=−Fail_Probability). In this way, although probabilities always range between 0 and 1, the pass score $P_{pass}$ ranges from 0 to 1 while the fail score $P_{fail}$ ranges from 0 to −1. It should be appreciated that in other examples, both the pass score and the fail score may both correspond directly to probabilities ranging from 0 to 1, in which case one of ordinary skill in the art will appreciate that the thresholds and inequalities described herein should be adjusted to account for fail scores ranging from 0 to 1.

Method 200 may calculate the probabilistic metric with a supervised learning method for probabilistic classification, for example, such as a Gaussian process classification, a k-nearest neighbors classification, a decision tree classification, and so on. In some examples, method 200 may use a probabilistic classifier to calculate the pass score $P_{pass}$ as well as the fail score $P_{fail}$ for the sample acquired at 205. In other examples, method 200 may use a probabilistic classifier to calculate the pass score $P_{pass}$, for the sample acquired at 205, and may then calculate the fail score $P_{fail}$ based on the pass score $P_{pass}$. For example, method 200 may calculate the fail score $P_{fail}$ by subtracting one from the pass score $P_{pass}$:

$$P_{fail}=P_{pass}-1.$$

In this way, a sample with a pass score $P_{pass}$ equal to one, thereby indicating a 100% probability that the vehicle component is nominal, will have a corresponding fail score $P_{fail}$ equal to 0, thereby indicating a 0% probability that the vehicle component is degraded, whereas a sample with a pass score $P_{pass}$ equal to 0.7, thereby indicating a 70% probability that the vehicle component is nominal, will have a corresponding fail score $P_{fail}$ equal to −0.3, thereby indicating a 30% probability that the vehicle component is degraded (since the Fail_Probability=−$P_{fail}$=0.3, for example).

The probabilistic classifier may be trained on a plurality of training data that comprises operating conditions for a given vehicle component in both a nominal or full-useful-life (FUL) state and a degraded or threshold state. A nominal or FUL vehicle component comprises the vehicle component in its worst performing but still acceptable state, while a degraded or threshold vehicle component comprises the vehicle component in its best performing but unacceptable state.

As an illustrative and non-limiting example, the vehicle component may comprise an SCR catalyst. The operating conditions used to train the probabilistic classifier may therefore comprise a mid-bed efficiency, or an efficiency of the SCR catalyst to convert NOx as measured midway through the SCR catalyst, and a tailpipe efficiency, or an efficiency of the SCR catalyst to convert NOx as measured downstream of the SCR catalyst in the tailpipe. As discussed hereinabove, such efficiencies may be measured according to signals generated, for example, by feedgas exhaust gas sensor 158, mid-bed exhaust gas sensor 164, and tailpipe exhaust gas sensor 162. For example, the mid-bed efficiency of the SCR catalyst may be calculated according to the difference between the exhaust gas concentration measured by the feedgas exhaust gas sensor 158 and the exhaust gas concentration measured by the mid-bed exhaust gas sensor 164, while the tailpipe efficiency of the SCR catalyst may be calculated according to the difference between the exhaust gas concentration measured by the feedgas exhaust gas sensor 158 or the mid-bed exhaust gas sensor 164 and the exhaust gas concentration measured by the tailpipe exhaust gas sensor 162. The operating conditions specifically used to train the probabilistic classifier may therefore comprise a plurality of mid-bed efficiencies and tailpipe efficiencies measured for one or more FUL SCR catalysts and one or more threshold SCR catalysts over a wide range of other vehicle operating conditions. An example of how the probabilistic classifier may be trained on such data is described further herein with regard to FIG. 3. Thus, the operating conditions sampled at 205 may comprise features for input to the probabilistic classifier. In the example of diagnosing an SCR catalyst, the mid-bed efficiency and the tailpipe efficiency may comprise features for input to the probabilistic classifier.

In some examples, a single probabilistic classifier may be used to calculate the pass score $P_{pass}$. In other examples, multiple individual probabilistic classifiers may be trained on individual features, and the results may be combined by averaging the individual results, also referred to in the art as boosting. For example, with regard to the SCR catalyst diagnostics described herein, a first probabilistic classifier may be trained on mid-bed efficiency data while a second probabilistic classifier may be trained on tailpipe efficiency data. The total pass score $P_{pass}$ may thus be obtained by a weighted sum of the individual pass scores output by the individual probabilistic classifiers:

$$P_{pass}=w_1 P_{Pass,1}+w_2 P_{pass,2},$$

wherein $w_1$ and $w_2$ are weights, $P_{pass,1}$ is a first pass score output by a first probabilistic classifier, and $P_{pass,2}$ is a second pass score output by a second probabilistic classifier. Separate small classifiers can be trained faster and result in a lower memory requirement than a single classifier trained on a large set of features.

After calculating the probabilistic metric including the pass score $P_{pass}$ and the fail score $P_{fail}$ at 210, method 200 continues to 215. At 215, method 200 determines if the pass score $P_{pass}$ is greater than a first threshold $T_1$. The first threshold $T_1$ comprises a first pass threshold, and is configured such that a pass score $P_{pass}$ greater than the first threshold $T_1$ is considered acceptable for diagnosing the vehicle component with confidence. If the pass score $P_{pass}$ is greater than the first threshold $T_1$ ("YES"), the pass score $P_{pass}$ is accepted and method 200 continues to 225, described further herein below.

However, if the pass score $P_{pass}$ is less than or equal to the first threshold $T_1$ ("NO"), method 200 continues to 220. At 220, method 200 determines if the fail score $P_{pass}$ is less than a second threshold $T_2$. The second threshold $T_2$ comprises a first fail threshold, and is configured such that a fail score $P_{fail}$ less than the second threshold $T_2$ is considered acceptable for diagnosing the vehicle component with confidence.

Thus, if the fail score $P_{fail}$ is not less than the second threshold $T_2$ ("NO"), then method 200 has determined that both the pass score $P_{pass}$ and the fail score $P_{fail}$ are ambiguous as to whether the vehicle component is nominal or degraded. Therefore, method 200 continues to 217, wherein method 200 rejects the sample, and method 200 returns.

However, referring again to 220, if the fail score $P_{fail}$ is less than the second threshold $T_2$ ("YES"), method 200 continues to 225. Thus, method 200 proceeds to 225 if the pass score $P_{pass}$ is greater than the first threshold $T_1$ or if the fail score $P_{fail}$ is less than the second threshold $T_2$. Method 200 thus calculates a probabilistic metric for pass/fail under all conditions but only accepts the results when the probability sufficiently indicates a pass or fail, and otherwise rejects the sample when the scores are ambiguous.

If the pass score $P_{pass}$ is greater than the first threshold $T_1$ or the fail score $P_{fail}$ is less than the second threshold $T_2$, method 200 continues to 225. At 225, method 200 calculates an average score $P_{avg}$ by averaging a plurality of probabilistic metrics, including the probabilistic metric calculated at 210, for a plurality of samples, including the sample acquired at 205. In one example, method 200 may calculate the average score $P_{avg}$ by summing the difference between the pass score $P_{pass}$ and the fail score $P_{fail}$ for each sample:

$$P_{avg} = \Sigma_{i=1}^{N}(P_{pass,i} - |P_{fail,i}|),$$

where $P_{pass,i}$ comprises the ith pass score $P_{pass}$, $|P_{fail,i}|$ comprises the absolute value of the ith fail score $P_{fail}$, and N is the current iteration number.

Continuing at 227, method 200 determines if the iteration number N is equal to the iteration threshold TN. The iteration threshold TN may be selected or defined such that the average score $P_{avg}$ is calculated for a sufficient number of samples. If the iteration number N is not equal to the iteration threshold TN ("NO"), method 200 continues to 228. At 228, method 200 increases the iteration number N by setting N equal to N+1. For example, if the current iteration number N is 1, method 200 sets the iteration number N to 2, while if the current iteration number N is 10, method 200 sets the iteration number N to 11, and so on. Method 200 then continues to 205 to sample the operating conditions. In this way, method 200 iterates until the iteration number N is equal to the iteration threshold TN, such that the average score $P_{avg}$ is calculated based on a number of samples and corresponding probabilistic metrics equal to the iteration threshold TN.

Referring again to 227, once the iteration number N equals the iteration threshold TN ("YES"), method 200 proceeds to 230. At 230, method 200 determines if the average score $P_{avg}$ is greater than a third threshold $T_3$. The third threshold $T_3$ comprises a second pass threshold, and is configured such that an average score $P_{avg}$ greater than the third threshold $T_3$ is considered a robust indication that the vehicle component is nominal. Thus, if the average score $P_{avg}$ is greater than the third threshold $T_3$ ("YES"), method 200 continues to 232, whereupon method 200 generates an indication that the vehicle component is nominal. The indication that the vehicle component is nominal may be stored in non-transitory memory of the controller 12. Method 200 then returns.

However, referring again to 230, if the average score $P_{avg}$ is less than or equal to the third threshold $T_3$, method 200 continues to 235. At 235, method 200 determines if the average score $P_{avg}$ is less than a fourth threshold $T_4$. The fourth threshold $T_4$ comprises a second fail threshold, and is configured such that an average score $P_{avg}$ less than the fourth threshold $T_4$ is considered a robust indication that the vehicle component is degraded.

If the average score is not less than the fourth threshold $T_4$ ("NO"), method 200 continues to 237, whereupon method 200 rejects the average score $P_{avg}$. Method 200 then returns. Thus, if the average score $P_{avg}$ is not greater than the third threshold $T_3$ and is not less than the fourth threshold $T_4$, the average score $P_{avg}$ is ambiguous as to whether the vehicle component is nominal or degraded, and the average score $P_{avg}$ is rejected.

However, referring again to 235, if the average score $P_{avg}$ is less than the fourth threshold $T_4$ ("YES"), the average score $P_{avg}$ sufficiently indicates that the vehicle component is degraded. Method 200 therefore continues to 240, whereupon method 200 generates an indication that the vehicle component is degraded. The indication may be stored in non-transitory memory of the controller 12, for example. At 245, method 200 outputs an alert that the vehicle component is degraded. The alert may be displayed to the operator of the vehicle, for example via a dashboard of the vehicle. The alert may generally indicate that the vehicle is in need of service, or the alert may specifically indicate that the vehicle component is in need of service. Additionally or alternatively, the alert may be stored in an OBD database accessible by an OBD scanner that a technician may communicatively couple to the vehicle, so that the technician may retrieve the alert indicating that the vehicle component is degraded via the OBD scanner. Method 200 then returns.

Thus, a method is provided for probabilistic on-board diagnostics. The method comprises calculating, with a probabilistic classifier, a probabilistic metric for a sample of a measured operating condition of a vehicle system component, averaging a plurality of probabilistic metrics including the probabilistic metric for a plurality of samples including the sample, and determining whether the vehicle system component is degraded based on the averaged plurality of probabilistic metrics.

As an illustrative example of the method 200, FIGS. 3-7 graphically depict an embodiment wherein the method 200 is configured to diagnose an SCR catalyst, such as SCR catalyst 152, of a vehicle. FIG. 3 shows a graph 300 illustrating training data for a probabilistic classifier according to an embodiment. As discussed hereinabove, a mid-bed efficiency and a tailpipe efficiency calculated based on measurements of exhaust gas concentrations at various points in the flow path of an SCR catalyst (specifically, upstream, mid-bed, and downstream) may be used as features for a probabilistic classifier. To that end, graph 300 shows a plurality of measurements of mid-bed efficiencies and tailpipe efficiencies. In particular, graph 300 includes a plurality of measurements 302 of mid-bed efficiencies and tailpipe efficiencies for a FUL SCR catalyst, depicted as shaded circles in graph 300, as well as a plurality of measurements 304 of mid-bed efficiencies and tailpipe efficiencies for a threshold SCR catalyst, depicted as unshaded circles in graph 300. Each circle on the graph 300 represents a particular measurement of a mid-bed efficiency and a tailpipe efficiency collected at a same instant. The plurality of measurements 302 and 304 are acquired over a wide range of operating points of a vehicle. In other words, the plurality of measurements 302 and 304 are not limited to collection during particular entry conditions. As depicted, the measurements of mid-bed and tailpipe efficiency extend across the full range of efficiencies for both threshold and FUL SCR catalysts, though the measurements 302 for FUL SCR catalysts are concentrated more densely in the upper-right corner of graph 300, while the measurements 304 for threshold SCR catalysts are concentrated densely proximate to the upper-right corner of graph 300. The method of averaging a plurality of probabilistic scores calculated over time thus provides a robust approach for diagnosing an SCR catalyst based on such measurements 302 and 304. In contrast, a threshold-based method, for example, would likely generate many false-positives and false-negatives if implemented with such measurements 302 and 304, and therefore such a threshold-based method may necessarily be limited to particular entry conditions for acquiring the measurements.

A probabilistic classifier such as a Gaussian process classifier is trained with a training dataset including the plurality of measurements 302 and 304, wherein the plurality of measurements 302 and 304 are respectively labeled as corresponding to a FUL SCR catalyst and a threshold SCR catalyst. During training of the probabilistic classifier, the probabilistic classifier learns probabilities that an SCR catalyst is nominal or degraded according to the plurality of measurements 302 and 304 and further according to the labels associated therewith. Graph 300 depicts a plurality of probability thresholds to illustrate various probabilities that may be learned by the probabilistic classifier. For example, the probability threshold 320 corresponds to a 90% probability that the SCR catalyst is nominal. Thus, if a measurement of a mid-bed efficiency and a tailpipe efficiency that is above the probability threshold 320 is input to the probabilistic classifier, the probabilistic classifier outputs a pass score $P_{pass}$ of 90% or greater that the SCR catalyst is nominal.

Similarly, the probability threshold 322 corresponds to an 80% probability that the SCR catalyst is nominal, the probability threshold 324 corresponds to a 70% probability that the SCR catalyst is nominal, the probability threshold 326 corresponds to a 60% probability that the SCR catalyst is nominal, the probability threshold 328 corresponds to a 50% probability that the SCR catalyst is nominal, the probability threshold 330 corresponds to a 40% probability that the SCR catalyst is nominal, the probability threshold 332 corresponds to a 30% probability that the SCR catalyst is nominal, the probability threshold 334 corresponds to a 20% probability that the SCR catalyst is nominal, and the probability threshold 336 corresponds to a 10% probability that the SCR catalyst is nominal.

Thus, if a measurement of mid-bed efficiency and tailpipe efficiency between the probability thresholds 320 and 322 is input to the probabilistic classifier, the probabilistic classifier outputs a pass score $P_{pass}$ between 0.8 and 0.9 (corresponding to a probability between 80% and 90% that the SCR catalyst is nominal). Similarly, if a measurement of mid-bed efficiency and tailpipe efficiency between the probability thresholds 322 and 324 is input to the probabilistic classifier, the probabilistic classifier outputs a pass score $P_{pass}$ between 0.7 and 0.8 (corresponding to a probability between 70% and 80% that the SCR catalyst is nominal). If a measurement of mid-bed efficiency and tailpipe efficiency between the probability thresholds 324 and 326 is input to the probabilistic classifier, the probabilistic classifier outputs a pass score $P_{pass}$ between 0.6 and 0.7 (corresponding to a probability between 60% and 70% that the SCR catalyst is nominal). If a measurement of mid-bed efficiency and tailpipe efficiency between the probability thresholds 326 and 328 is input to the probabilistic classifier, the probabilistic classifier outputs a pass score $P_{pass}$ between 0.5 and 0.6 (corresponding to a probability between 50% and 60% that the SCR catalyst is nominal). If a measurement of mid-bed efficiency and tailpipe efficiency between the probability thresholds 328 and 330 is input to the probabilistic classifier, the probabilistic classifier outputs a pass score $P_{pass}$ between 0.4 and 0.5 (corresponding to a probability between 40% and 50% that the SCR catalyst is nominal). If a measurement of mid-bed efficiency and tailpipe efficiency between the probability thresholds 330 and 332 is input to the probabilistic classifier, the probabilistic classifier outputs a pass score $P_{pass}$ between 0.3 and 0.4 (corresponding to a probability between 30% and 40% that the SCR catalyst is nominal). If a measurement of mid-bed efficiency and tailpipe efficiency between the probability thresholds 332 and 334 is input to the probabilistic classifier, the probabilistic classifier outputs a pass score $P_{pass}$ between 0.2 and 0.3 (corresponding to a probability between 20% and 30% that the SCR catalyst is nominal). If a measurement of mid-bed efficiency and tailpipe efficiency between the probability thresholds 334 and 336 is input to the probabilistic classifier, the probabilistic classifier outputs a pass score $P_{pass}$ between 0.1 and 0.2 (corresponding to a probability between 10% and 20% that the SCR catalyst is nominal). If a measurement of mid-bed efficiency and tailpipe efficiency below the probability threshold 336 is input to the probabilistic classifier, the probabilistic classifier outputs a pass score $P_{pass}$ below 0.1 (corresponding to a probability below 10% that the SCR catalyst is nominal). Corresponding fail scores may be calculated from the pass scores as described above.

FIG. 4 shows a set of graphs 400 illustrating an example probability metric according to an embodiment. In particular, the set of graphs 400 illustrate example pass scores 405 for a FUL SCR catalyst as well as pass scores 410 for a threshold SCR catalyst. The set of graphs 400 further illustrates a pass threshold 415, referred to hereinabove with regard to FIG. 2 as the first threshold $T_1$. As depicted, the pass threshold 415 may be selected or configured such that pass scores above the pass threshold 415 are considered valid while pass scores below the pass threshold 415 are considered uncertain or ambiguous and therefore are rejected.

Similarly, FIG. 5 shows a set of graphs 500 illustrating an example probability metric according to an embodiment. In particular, the set of graphs 500 illustrate fail scores 505 for a nominal SCR catalyst as well as fail scores 510 for a threshold SCR catalyst. The fail scores 505 and 510 may be calculated from the pass scores 405 and 410 depicted in FIG. 4. The set of graphs 500 further illustrates a fail threshold 515, referred to hereinabove with regard to FIG. 2 as the second threshold $T_2$. As depicted, the fail threshold 515 may be selected or configured such that fail scores below the fail threshold 515 are considered valid while fail scores above the fail threshold 515 are considered uncertain or ambiguous and therefore are rejected.

FIG. 6 shows a set of graphs 600 illustrating an example calculation of an average probabilistic metric according to an embodiment. In particular, the set of graphs 600 illustrate a plurality of pass scores 603 (depicted as circles) and a corresponding plurality of fail scores 605 (depicted as squares) calculated for samples of mid-bed efficiencies and tailpipe efficiencies over time for an SCR catalyst such as SCR catalyst 152. The set of graphs 600 further illustrate a number of samples 615 suitable for averaging over time. As depicted, the number of samples 615 only increments when an individual result is accepted. More specifically, the number of samples 615 only increments when either a pass score of the plurality of pass scores 603 is above the pass threshold 607, or a fail score of the plurality of fail scores 605 is below the fail threshold 608. As depicted, some of the pass scores 603 are not above the pass threshold 607, and so the number of samples 615 does not increment upon collection of such samples.

The set of graphs 600 further illustrates a running mean or average score 625 calculated over time. When the number of samples 615 reaches a threshold number of samples, the average score 625 at that time is used to determine whether the SCR catalyst 152 is degraded. If the average score 625 is above the pass threshold 627, the SCR catalyst 152 is considered nominal or functioning within normal limits, whereas if the average score 625 is below the fail threshold 629, the SCR catalyst 152 is considered degraded or malfunctioning. As depicted, the pass threshold 627 for the average score 625 is different from the pass threshold 607 for the probabilistic metric, and similarly the fail threshold 629 for the average score 625 is different from the fail threshold 608 for the probabilistic metric. In the present example, the SCR catalyst 152 is nominal, and so the average score 625 is above the pass threshold 627 at both times that the threshold number of samples is reached.

Further, in the depicted example, the threshold number of samples for diagnosing the SCR catalyst 152 is set to twelve. It should be appreciated, however, that a number of samples less than or greater than twelve may be used as the threshold number of samples. Furthermore, after determining the state of the SCR catalyst 152 when the threshold number of samples is reached, the average score 625 and the number of samples 615 are reset to zero. In this way, the functioning of the SCR catalyst 152 may be continuously and regularly monitored over time, rather than during specific entry conditions, thereby improving the IUMPR. Furthermore, since the method for diagnosing the SCR catalyst 152 is not limited to specific entry conditions, the SCR catalyst 152 may be monitored without regard for the driving conditions or the state of the emissions drive cycles.

FIG. 7 shows a graph 700 illustrating a plurality of average scores according to an embodiment. In particular, graph 700 depicts average scores 705 for a threshold SCR catalyst as well as average scores 715 for a FUL SCR catalyst. Graph 700 depicts a fail threshold 707, referred to hereinabove with regard to FIG. 2 as the fourth threshold $T_4$, below which an average score such as one of the average scores 705 is considered acceptable. Similarly, graph 700 depicts a pass threshold 712, referred to hereinabove with regard to FIG. 2 as the third threshold $T_3$, above which an average score such as one of the average scores 710 is considered acceptable. Average scores between the fail threshold 707 and the pass threshold 712 may be considered uncertain or ambiguous and thus may be rejected.

As depicted, some average scores of the average scores 705 and 710 are calculated based on a relatively small number of samples. For example, for the average scores 705 of the threshold SCR catalyst, some of the average scores 705 calculated based on less than five samples are within the acceptable range (below threshold 707) as well as the reject range (between thresholds 707 and 712). In order to obtain an accurate decision as to whether an SCR catalyst is degraded or malfunctioning, the iteration threshold TN described hereinabove with regard to FIG. 2 may therefore be selected or configured such that the average score is calculated based on a sufficient number of samples.

In this way, probabilistic diagnosis of a vehicle system component is enabled at times when a traditional approach would not have evaluated a performance metric, thereby improving IUMPR. Furthermore, the systems and methods provided herein enable the automatic identification of conditions and measurements where large separation occurs, thereby improving the robustness of on-board diagnostics.

A technical effect of the present disclosure is the continuous monitoring and diagnosis of a vehicle system component regardless of driving conditions of the vehicle. Another technical effect of the present disclosure is the robust and unambiguous detection of degradation of a vehicle system component. Yet another technical effect of the present disclosure is the generation of an alert indicating a degraded vehicle system component.

As one embodiment, a method comprises calculating, with a probabilistic classifier, a probabilistic metric for a sample of a measured operating condition of a vehicle system component, averaging a plurality of probabilistic metrics including the probabilistic metric for a plurality of samples including the sample, and determining whether the vehicle system component is degraded based on the averaged plurality of probabilistic metrics.

In a first example of the method, the method further comprises discarding the sample if the probabilistic metric is within a threshold range. In a second example of the method optionally including the first example, the vehicle system component comprises a selective catalytic reduction (SCR) catalyst, and the measured operating condition comprises an efficiency of the SCR catalyst. In a third example of the method optionally including one or more of the first and second examples, the method further comprises sensing exhaust gas concentrations at one or more of a position upstream of the SCR catalyst, a position in the middle of the SCR catalyst, and a position downstream of the SCR catalyst. In a fourth example of the method optionally including one or more of the first through third examples, the method further comprises calculating a mid-bed efficiency of the SCR catalyst and a tailpipe efficiency of the SCR catalyst, wherein the efficiency of the SCR catalyst comprises the mid-bed efficiency and the tailpipe efficiency. In a fifth example of the method optionally including one or more of the first through fourth examples, the probabilistic classifier comprises one of a Gaussian process classifier, a k-nearest neighbors classifier, and a decision tree classifier. In a sixth example of the method optionally including one or more of the first through fifth examples, the probabilistic metric comprises a pass score calculated by the probabilistic classifier and a fail score calculated from the pass score. In a seventh example of the method optionally including one or more of the first through sixth examples, averaging the plurality of probabilistic metrics comprises summing a difference between the pass score and the fail score for each sample of the plurality of samples.

As another embodiment, a method for on-board diagnostics of a vehicle system component comprises: acquiring a sample of operating conditions related to the vehicle system component; calculating a probabilistic metric for the sample; calculating an average score from a plurality of probabilistic metrics including the probabilistic metric for a plurality of samples including the sample; responsive to the average score above a first threshold, indicating that the vehicle system component is nominal; responsive to the average score below a second threshold, indicating that the vehicle system component is degraded; and responsive to the average score between the first threshold and the second threshold, discarding the average score.

In a first example of the method, the method further comprises determining that a second probabilistic metric of the plurality of probabilistic metrics calculated from a second sample of the plurality of samples is within a second threshold range, and discarding the second probabilistic metric and the second sample such that the second probabilistic metric and the second sample are not included in the calculation of the average score. In a second example of the method optionally including the first example, calculating the probabilistic metric for the sample comprises inputting the sample to a probabilistic classifier, the probabilistic classifier trained with a plurality of data for a second vehicle system component in a full-useful-life (FUL) state and a third vehicle system component in a threshold state. In a third example of the method optionally including one or more of the first and second examples, the probabilistic metric comprises a pass score and a fail score, and the method further comprises discarding the sample if the pass score is below a third threshold and the fail score is above a fourth threshold. In a fourth example of the method optionally including one or more of the first through third examples, the method further comprises calculating the average score when a number of samples in the plurality of samples reaches a threshold number of samples.

As yet another embodiment, a system comprises a vehicle system component, at least one sensor configured to measure an operating condition of the vehicle system component, and a controller communicatively coupled to the at least one sensor and configured with executable instructions in non-transitory memory that when executed cause the controller to: calculate, with a probabilistic classifier, a probabilistic metric for a sample of the operating condition of the vehicle system component measured by the at least one sensor; average a plurality of probabilistic metrics including the probabilistic metric for a plurality of samples including the sample; and determine whether the vehicle system component is degraded based on the averaged plurality of probabilistic metrics.

In a first example of the system, the vehicle system component comprises a selective catalytic reduction (SCR) catalyst. In a second example of the system optionally including the first example, the at least one sensor comprises a first exhaust gas sensor positioned proximate to and upstream of the SCR catalyst, a second exhaust gas sensor positioned in the middle of the SCR catalyst, and a third exhaust gas sensor positioned proximate to and downstream of the SCR catalyst. In a third example of the system optionally including one or more of the first and second examples, the sample of the operating condition comprises a mid-bed efficiency and a tailpipe efficiency of the SCR catalyst measured by the first exhaust gas sensor, the second exhaust gas sensor, and the third exhaust gas sensor. In a fourth example of the system optionally including one or more of the first through third examples, the probabilistic metric includes a pass score and a fail score, and the controller is further configured with executable instructions in the non-transitory memory that when executed cause the controller to reject the sample from the plurality of samples if the pass score is below a first threshold and the fail score is above a second threshold. In a fifth example of the system optionally including one or more of the first through fourth examples, the controller is further configured with executable instructions in the non-transitory memory that when executed cause the controller to reject the averaged plurality of probabilistic metrics if the averaged plurality of probabilistic metrics is within a threshold range, and determine that the vehicle system component is degraded if the averaged plurality of probabilistic metrics is below the threshold range. In a sixth example of the system optionally including one or more of the first through fifth examples, the controller is further configured with executable instructions in the non-transitory memory that when executed cause the controller to generate and output an alert indicating that the vehicle system component is degraded when the averaged plurality of probabilistic metrics is below the threshold range.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for on-board diagnostics of a vehicle system component, comprising:
   a controller acquiring a sample of signals from a sensor, and the sensor generating the signals based on the operating conditions related to the vehicle system component;
   calculating a probabilistic metric for the acquired sample;
   calculating an average score from a plurality of probabilistic metrics including the probabilistic metric for a plurality of samples including the sample;

responsive to the average score above a first threshold, indicating that the vehicle system component is nominal;

responsive to the average score below a second threshold, the controller outputting an alert indicating that the vehicle system component is degraded; and responsive to the average score between the first threshold and the second threshold, discarding the average score.

2. The method of claim 1, further comprising determining that a second probabilistic metric of the plurality of probabilistic metrics calculated from a second sample of the plurality of samples is within a second threshold range, and discarding the second probabilistic metric and the second sample such that the second probabilistic metric and the second sample are not included in the calculation of the average score.

3. The method of claim 1, wherein calculating the probabilistic metric for the sample comprises inputting the sample to a probabilistic classifier, the probabilistic classifier trained with a plurality of data for a vehicle system component in a full-useful-life (FUL) state and a vehicle system component in a threshold state.

4. The method of claim 1, wherein the probabilistic metric comprises a pass score and a fail score, and further comprising discarding the sample if the pass score is below a third threshold and the fail score is above a fourth threshold.

5. The method of claim 1, further comprising calculating the average score when a number of the plurality of samples reaches a threshold number of samples, and wherein the vehicle system component comprises a selective catalytic reduction (SCR) catalyst.

\* \* \* \* \*